United States Patent [19]

Knothe et al.

[11] Patent Number: 4,884,645

[45] Date of Patent: Dec. 5, 1989

[54] PRECISION BALANCE WITH SCALE ON TOP

[75] Inventors: Erich Knothe, Eddigehausen; Franz-Josef Melcher, Hardegsen, both of Fed. Rep. of Germany

[73] Assignee: Sartorius GmbH, Fed. Rep. of Germany

[21] Appl. No.: 323,892

[22] Filed: Mar. 15, 1989

[30] Foreign Application Priority Data

Mar. 26, 1988 [DE] Fed. Rep. of Germany ....... 3810469

[51] Int. Cl.$^4$ ............................................. G01G 21/28
[52] U.S. Cl. ..................................... 177/180; 177/243
[58] Field of Search .................. 177/179, 180, 238–243

[56] References Cited

U.S. PATENT DOCUMENTS

| 4,285,412 | 8/1981 | Wirth | 177/180 X |
| 4,442,910 | 4/1984 | Mikami | 177/25.18 |
| 4,526,246 | 7/1985 | Patoray | 177/179 |

Primary Examiner—George H. Miller, Jr.
Attorney, Agent, or Firm—Eric P. Schellin

[57] ABSTRACT

In an electric precision balance with scale on top, protected against the penetration of foreign bodies and with a low-displacement measuring system (1), a parallel-guided balance scale carrier (3) for a balance scale (11) which is guided without contact through a housing opening (4) of a surrounding system housing (2) or protective cap, the balance scale carrier (3) is designed for its part with its part running upward outside of the system housing (2) as a protective hood (8) which covers the system housing (2) at least at the top and the sides and which comprises receiving bearings (9) at the low edge (8') for intermediary members (10) which support the balance scale (11), said intermediary members are surrounded without contact by casings (12) which form foreign-body baffles open at the top and the bottom which are a component of a general housing (7) surrounding the system housing (2) and said general housing comprises drainage openings (17,17') located in its low bottom parts.

10 Claims, 1 Drawing Sheet

PRECISION BALANCE WITH SCALE ON TOP

BACKGROUND OF THE INVENTION

The invention relates to a precision balance with a scale on top. Such balances are known e.g. from German utility model No. G 85 05 720, in which the penetration of foreign bodies into the measuring system is prevented in that the balance scale carrier, which is extended without contact through an opening in the housing, is surrounded by a membrane which bridges the free area between the balance scale pin and the opening in the housing. The membrane, in the form of a thin plastic skin, should on the one hand exhibit sufficient inherent strength to repel spray water, deleterious media or foreign bodies, yet, on the other hand, in the case of high-resolution precision balances, be as thin as possible and this as free as possible of restricting force in order not to distort the result of weighing. The mutually contradictory requirements have the result that the tightness of the membrane itself and at its connection points to the housing and the balance scale pin slackens in the course of time under the influence of mechanical stress, deleterious media and temperature differences and moisture, especially spray water, penetrates into the sensitive electronic measuring system and since the membrane is located at a high position, the penetrated liquid has no possibility of leaving the encapsulated system.

Similar disadvantages are displayed by another known balance (EP-OS No. 35 579), in which the movable load carrier exhibits the form of a closed parallelepiped and encloses the bottom plate carrying the weighing system. The latter is supported by three feet and the annular openings between the support feet and the bottom plate of the load carrier are closed by rubber sleeves or rubber membranes. In order not to distort the result of weighing in the case of small maximum loads, the encapsulated weighing system must be additionally supplemented by pressure compensation means such as porous wall sections or elastic bellows.

SUMMARY OF THE INVENTION

The invention therefore has the task of meeting the requirements for securing the measuring system against the penetration of foreign bodies and spray water with simple design means without adversely affecting the given possibilities of the measuring system for high resolution.

BRIEF DESCRIPTION OF THE DRAWINGS

The concept of the invention is explained in more detail in two examples of embodiments with reference made to the enclosed drawings.

DETAILED DESCRIPTION OF THE DRAWINGS

Figure 1:
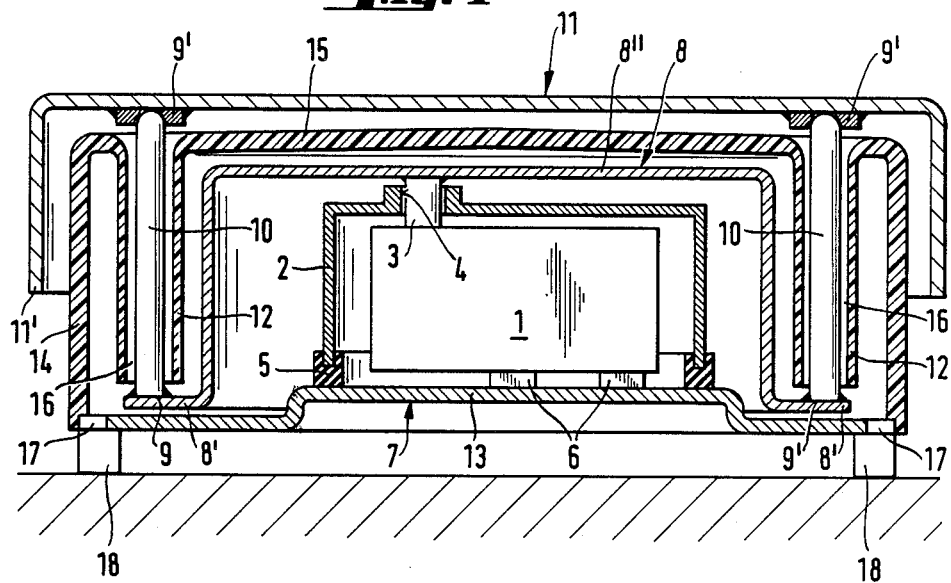
FIG. 1 shows a schematic vertical section through a preferred embodiment.

According to FIG. 1, a low-displacement measuring system 1 e.g. according to the principle of the electromagnetic compensation of force or with oscillating chord or with tuning-fork resonator or wire strain gauge is indicated only schematically here as it is taken from the state of the art. This measuring system 1 is fixed to fixed points 6 of housing base 13 of general housing 7 whereas the movable and parallel-guided part merges as actual load receiver into balance scale carrier 3, which extends upward without contact through housing opening 4 of system housing 2. This system housing 2, in the form of a cap here, surrounds the actual measuring system 1 and other electronic components and is fastened by seals 5 to housing base 13 of surrounding general housing 7. Balance scale carrier 3 merges for its part into a protective hood 8 which extends over system housing 2 with its hood cover 8″ and circumferential or at least two opposite side parts and, if necessary, also with other bottom parts. Hood edge 8′ comprises receiving bearings 9 located as deep as possible for rod shaped intermediary members 10 of balance scale 11, which, is designed as a platform having a depending skirt 11′ and comprises such an intermediary member 10 at each of the four corner areas.

Intermediary members 10 are screwed on or welded on according to FIG. 1 at 8′ and balance scale 11 extends with fixing bearings 9′ over the ends of intermediary members 10.

In order to form further baffles against the penetration of foreign bodies and spray water into the area of housing opening 4, intermediary members 10 are surrounded without contact by casings 12 comprising openings at the top and the bottom. Casings 12 are integrated at the top into housing cover 15 of general housing 7 which surrounds system housing 2. The hood-like housing top consisting of housing cover 15 and side parts 14 with casings 12 is preferably designed in one piece as a molded plastic part and connected in a detachable manner to housing base 13. Housing base 13, which rests on housing feet 18 and consists with preference of metal, is designed in such a manner that drainage openings 17, 17′ are located at the lowest points of housing 13 directly under casings 12 and receiving bearings 9 to the side in their vicinity on the outer edge of base plate 13 and assure a flow-off of spray water. Free space 16 between casing 12 and intermediary member 10 is so large that capillary effects in conjunction with liquid are excluded.

In the same manner, housing cover 15 running between balance scale 11 and hood cover 8″ in the intermediary area is designed so as to drop obliquely toward the periphery so that any spray water which might penetrate here can also be rapidly removed.

Figure 2:
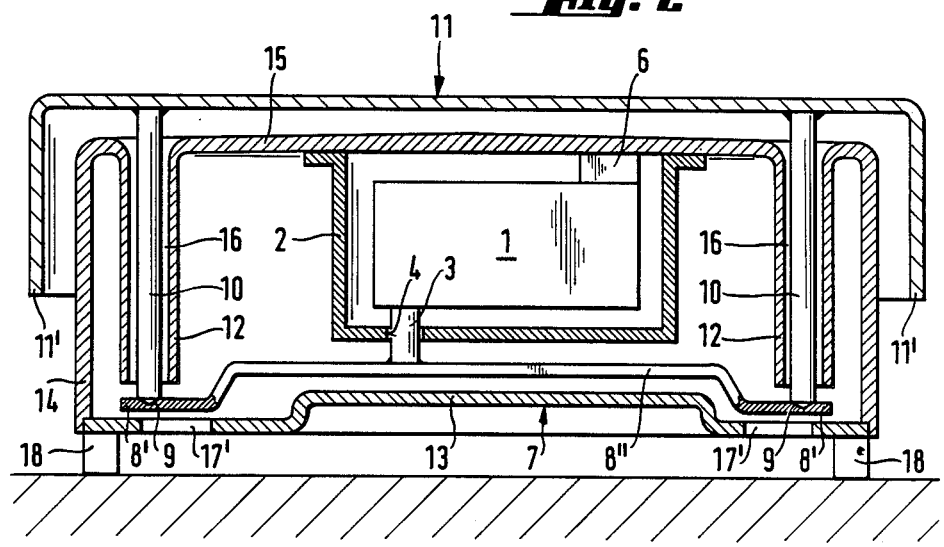
FIG. 2 shows a variant of FIG. 1 in a corresponding representation.

In the embodiment of FIG. 2, measuring system 1 and system housing 2 are fastened to cover 15 of general housing 7. Balance scale carrier 3 merges downward and laterally into a plate or arms 8″ which terminate at their periphery in receiving bearings 8′ for intermediary members 10 of balance scale 11. In this embodiment, cover 15, side walls 14 and casings 12 are formed with advantage of metal in order to be able to receive the load from the loading of the balance scale without deformation.

As a result of the elimination of any sealing membranes and the assurance of a pressure compensation via openings 17,17′ and 4, this design principle is also suitable for high-resolution precision balances.

We claim:

1. An electronic precision balance with the weighing surface on top, protected against the penetration of foreign bodies and with a low-displacement measuring system, a parallel-guided balance scale carrier for a balance scale which is guided through a housing opening of a surrounding system housing or protective cap, comprising in that the balance scale carrier (3) is designed for its part with its part running without contact through an opening (4) upward outside of the system housing (2) as a protective hood (8) which covers the system housing (2) at least at the top and the sides and which comprises receiving bearings (9) at the low hood edge (8′) for intermediary members (10) which support the balance scale (11) and that said intermediary members are surrounded without contact by casings (12) which form foreign-body baffles open at the top and the bottom which are a component of a general housing (7) surrounding the system housing (2) and that said general housing comprises drainage openings (17,17′) located in its low bottom parts.

2. An electronic precision balance with weighing surface on top, protected against the penetration of foreign bodies and with a low-displacement measuring system, a parallel-guided balance scale carrier for a balance scale which is guided through a housing opening of a surrounding system housing or protective cap, comprising in that the balance scale carrier (3) merges for its part with its part running downward without contact through an opening (4) outside of the system housing (2) into laterally extending arms (8″) which terminate in receiving bearings (9) for intermediary members (10) which support the balance scale (11) and that said intermediary members are surrounded without contact by casings (12) which form foreign-body baffles open at the top and the bottom which are a component of a general housing (7) surrounding the system housing (2) and that said general housing comprises drainage openings (17,17′) located in its low bottom parts.

3. The precision balance with the weighing surface on top according to claim 2, wherein the drainage openings (17) are located on the outer edge of the bottom part (13) of the general housing (7).

4. The precision balance with the weighing surface on top according to claim 2, therein the drainage openings (17′) are located directly under the casings (12) and receiving bearings (9) for the balance scale.

5. The precision balance with the weighing surface on top according to claim 2, wherein the cover (15) of the general housing (7) is designed so that it drops off obliquely toward the periphery.

6. The precision balance with the weighing surface on top according to claim 5, wherein the balance scale (11) is designed as a platform and contacts the receiving bearings (9) of the balance scale carrier (3,8) via at least three bolt-shaped intermediary members (10) or is supported via at least three receiving bearings (9′) on bolt-shaped intermediary members (10) of the balance scale carrier (3,8).

7. The precision balance with the weighing surface on top according to claim 6, wherein the casings (12) are a component of the housing cover (15) and the side walls (14) and jointly form a one-piece molded plastic part (12,14,15) whose side walls (14) are supported on the base plate (13).

8. The precision balance with the weighing surface on top according to claim 1, wherein the drainage openings (17) are located on the outer edge of the bottom part (13) of the general housing (7).

9. The precision balance with the weighing surface on top according to claim 1, wherein the drainage openings (17′) are located directly under the casings (12) and receiving bearings (9) for the balance scale.

10. The precision balance with the weighing surface on top according to claim 1, wherein the cover (15) of the general housing (7) is designed so that it drops off obliquely toward the periphery.

* * * * *